United States Patent [19]

Okada et al.

[11] Patent Number: 5,025,153
[45] Date of Patent: Jun. 18, 1991

[54] SCANNING TUNNELING SPECTROSCOPE AND A SPECTROSCOPIC INFORMATION DETECTION METHOD

[75] Inventors: Takao Okada, Hachioji; Akira Yagi, Sagamihara; Seizo Morita, Morioka; Nobuo Mikoshiba, Sendai, all of Japan

[73] Assignee: Olympus Optical Co., Ltd., Tokyo, Japan

[21] Appl. No.: 549,469

[22] Filed: Jul. 6, 1990

[30] Foreign Application Priority Data

Jul. 11, 1989 [JP] Japan .................................. 1-177063

[51] Int. Cl.⁵ .............................................. H01J 37/00
[52] U.S. Cl. ..................................... 250/306; 250/307
[58] Field of Search .............................. 250/306, 307; 324/158 D, 158 R; 302/358, 441; 328/162, 165

[56] References Cited

U.S. PATENT DOCUMENTS 4,870,352 9/1989 Koechner ............................ 250/306
4,894,537 1/1990 Blackford et al. .................. 250/306

Primary Examiner—Jack I. Berman
Assistant Examiner—Kiet T. Nguyen
Attorney, Agent, or Firm—Frishauf, Holtz, Goodman & Woodward

[57] ABSTRACT

A scanning tunnel spectroscope comprises a generator for applying a bias voltage ($V_T$) of a sin wave between a sample and probe, an I-V converter for converting a tunnel current flowing when the probe is set close to the sample, to a tunnel current representing voltage singal ($I_T$), a detector for detecting the absolute value of the voltage signal ($I_t$), and a servo circuit for servo-controlling a distance between the sample and probe using the absolute value with the servo time constant set larger than five times the period of the bias voltage. The information concerning the unevenness of the sample is obtained based on an output of the servo control means. A unit is provided for effecting the analog operation to derive a differential conductance based on the tunnel current on the real time basis and measuring the unevenness data and differential conductance between the sample and probe kept constant.

20 Claims, 15 Drawing Sheets

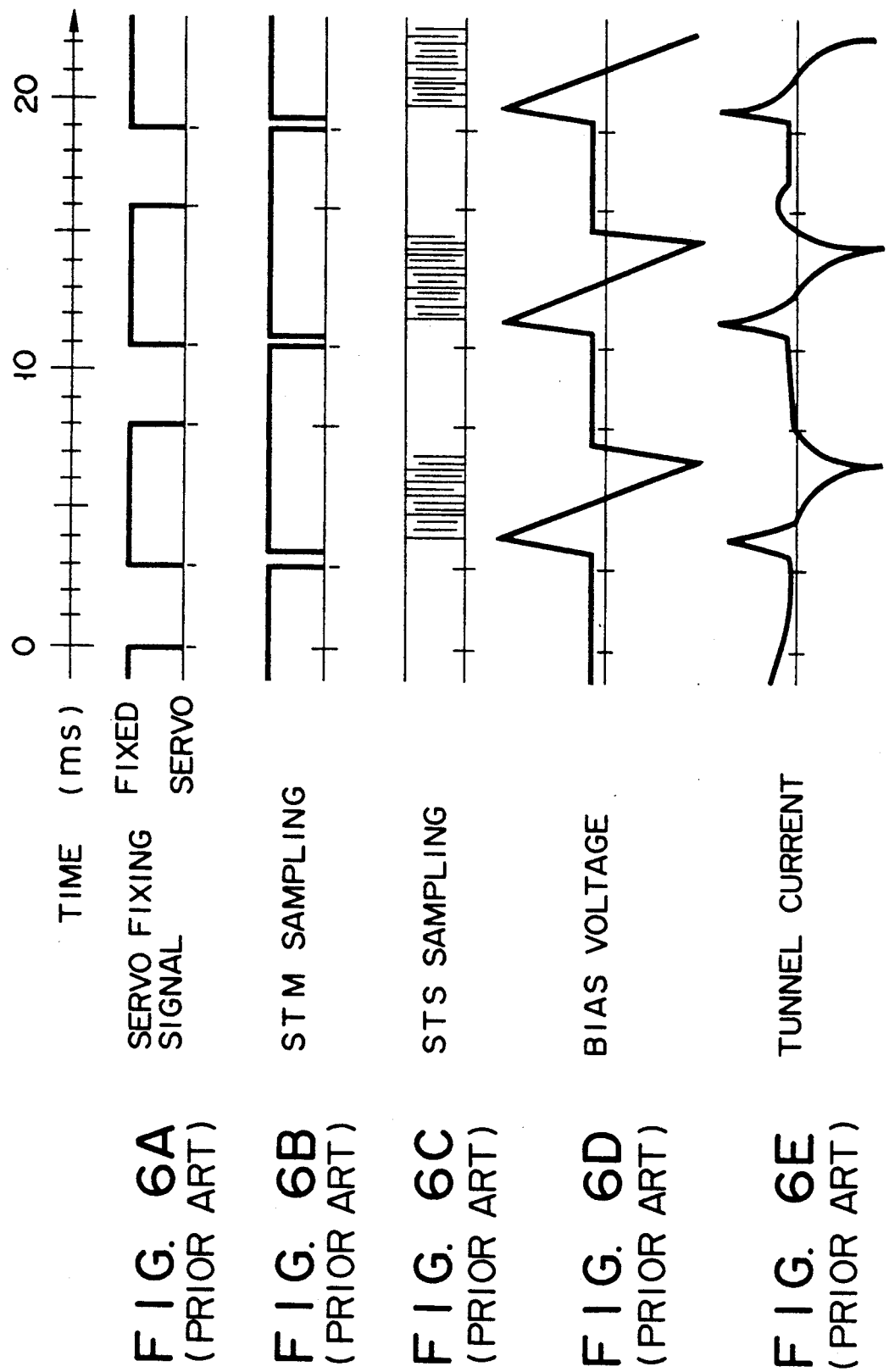

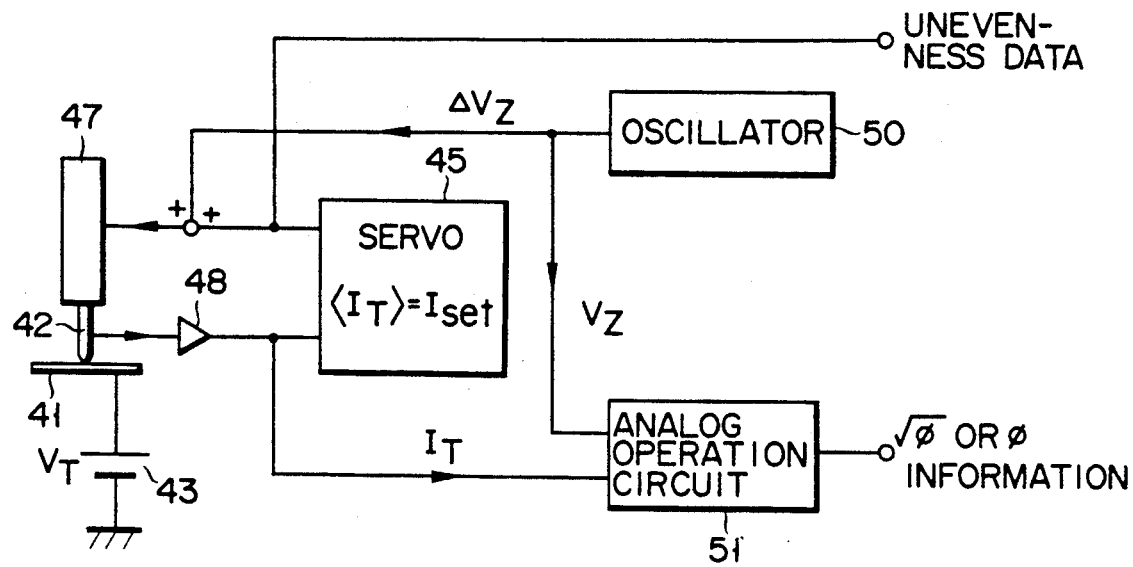
F I G. 10
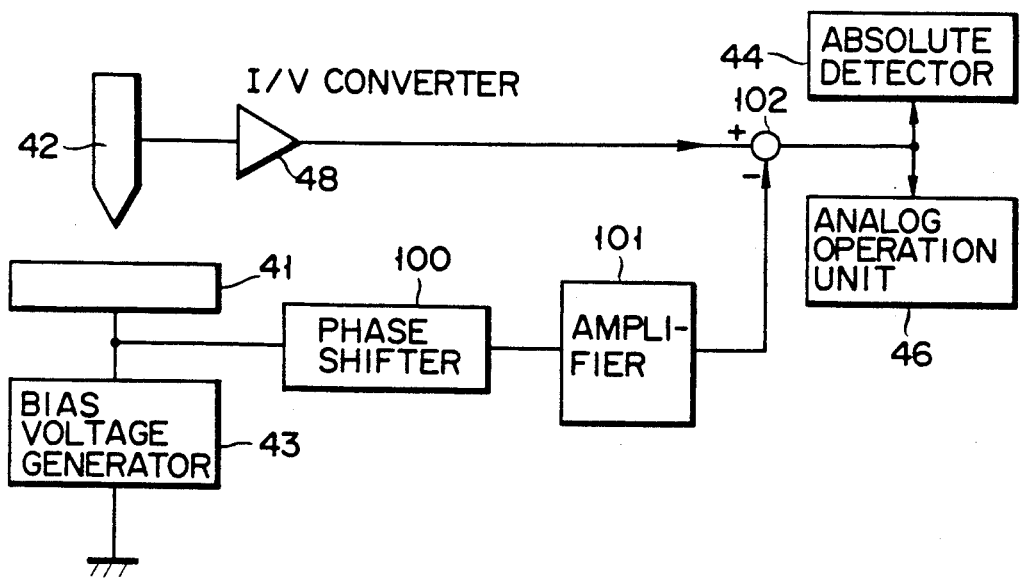
F I G. 11

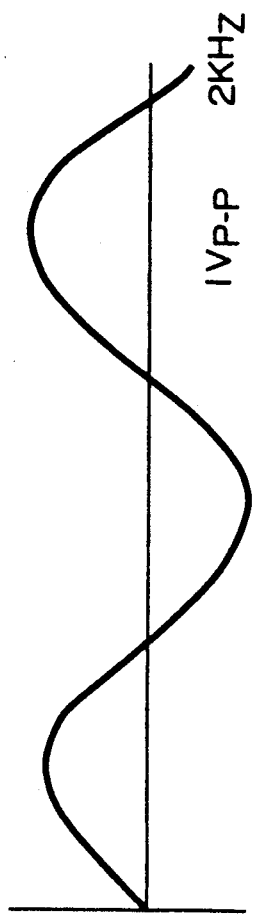
FIG. 12A  BIAS VOLTAGE $V_T$
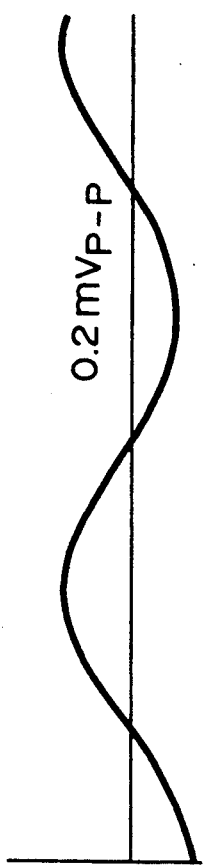
FIG. 12B  CAPACITIVE COUPLING VOLTAGE
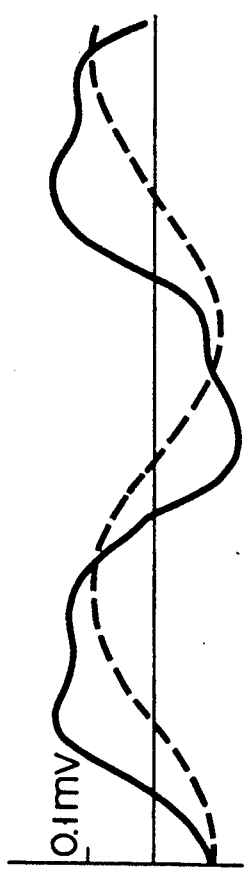
FIG. 12C  CURRENT/VOLTAGE CONVERTER OUTPUT ($\times 10^8$ V/A)
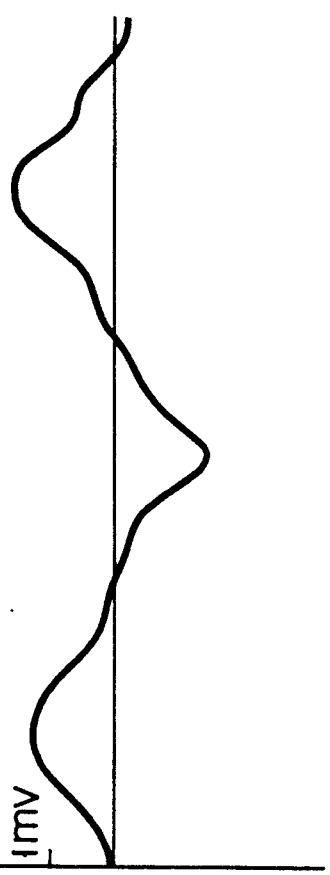
FIG. 12D

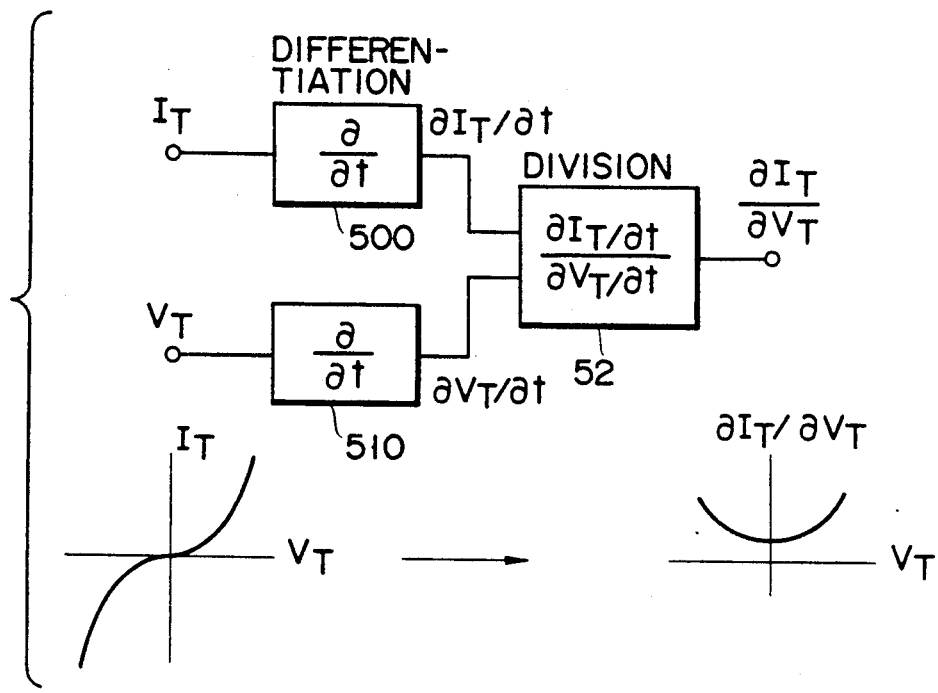
F I G. 13
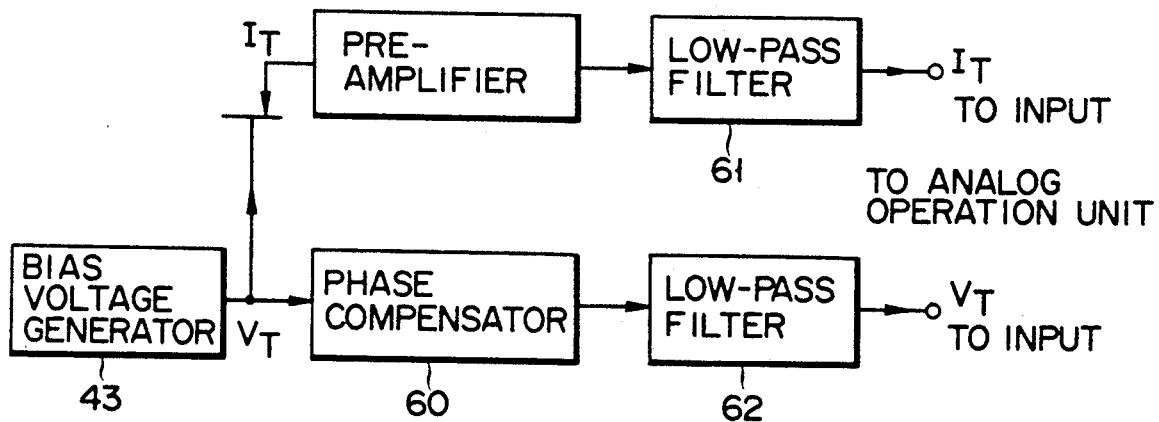
F I G. 15

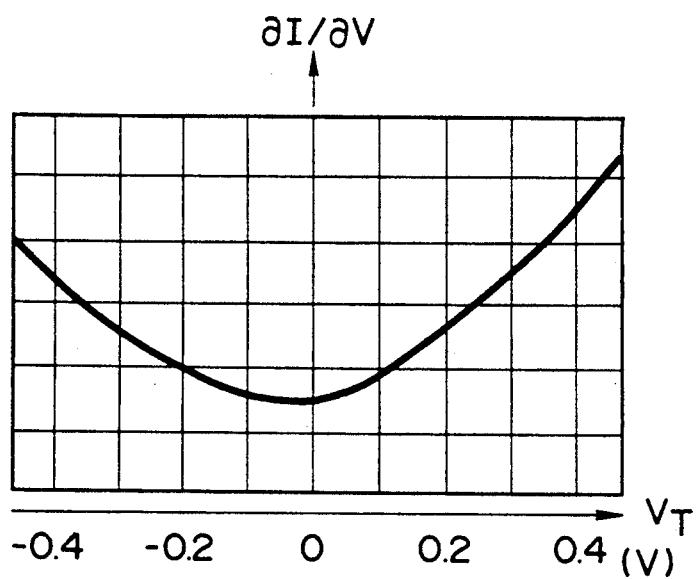
F I G. 16A
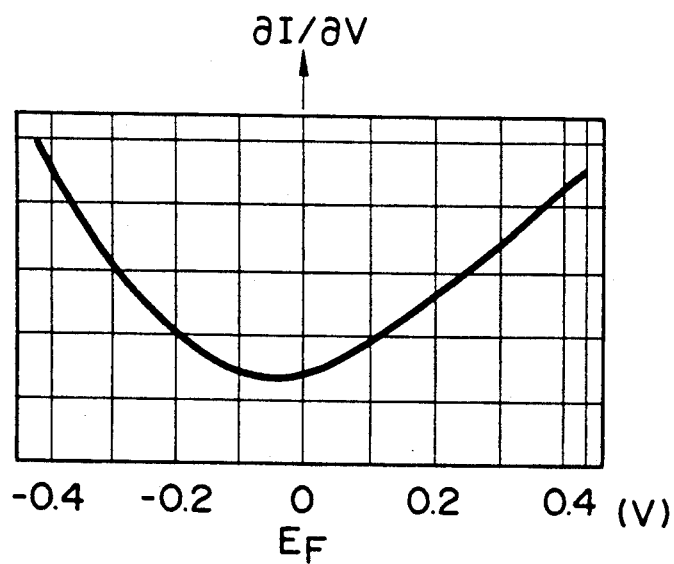
F I G. 16B

UNEVENNESS IMAGE $V_T = 0.2(V)$ DIFFERENTIAL CONCUCTANCE IMAGE

Y↓Z 3Å/div
3Å/div → X

SCANNING TUNNELING SPECTROSCOPE AND A SPECTROSCOPIC INFORMATION DETECTION METHOD

BACKGROUND OF THE INVENTION

1. Field of the Invention

This invention relates to a scanning tunneling microscope (STM) which are capable of measuring the shape of the surface of an electrically conductive sample with an atomic-level resolution using the tunneling effect of electrons and a spectroscopic information detection method.

2. Description of the Related Art

In the STM, an STM image of a sample is detected by scanning a pointed probe while a tunnel current locally flowing between the sample and the tip end of the pointed probe is kept constant.

The STM image contains two types of information including microscopic roughness of the surface of the sample and microscopic variation in the physical property of electrons therein. Therefore, if the latter information is constant for the samples, the STM image will represent the unevenness of the surface of the sample. A method for creating an image indicating the distribution of the electronic physical properties on the surface of the sample while the probe is controlled by the STM is called a scanning tunneling spectroscopy (STS).

When a pointed probe is set at a distance of approx. 10 Å from the surface of an electrically conductive sample with a bias voltage $V_T$ applied to the surface of the sample, a tunnel current $I_T$ starts to flow. In the STM, an STM image indicating the surface condition of the sample can be obtained by scanning the probe along an XY plane parallel to the surface of the sample while the probe is being finely moved by means of a servocontrol in a Z direction so as to keep the tunnel current unchanged and recording the movement of the probe in the Z direction. The tunnel current $I_T$ exhibits the following exponential function with respect to a distance S between the probe and the sample:

$$I_T = \frac{V_T}{R_T} \exp(-BS\sqrt{\phi}) \quad (1)$$

where B denotes a numerical coefficient (approx. 1.025Å$\sqrt{eV}$), $R_T$ denotes a tunnel resistance, and $\phi$ denotes a tunnel barrier height ($\phi=(\phi 1+\phi 2)/2$, $\phi 1$ is a work function of the probe and $\phi 2$ is a work function of the sample). The tunnel barrier height $\phi$ for the clean metal surface is approx. 1 to 5 eV, and the tunnel current $I_T$ may vary by one digit according to the equation (1) when the distance S varies by 1 Å. In the STM, a servo operation for keeping the tunnel current constant is effected by using variation in the tunnel current $I_T$ to detect variation in the distance S between the probe and the sample and finely moving the probe or sample in the Z direction by means of the finely moving element of a piezoelectric member to control the distance S. The control operation can attain the precision of less than 1 Å, and a 3-dimensional microscopic image or STM image of an atomic-size order can be obtained by recording a control voltage and the movement of the probe in the XY directions.

In a case wherein a sample in which the tunnel barrier height $\phi$ and tunnel resistance $R_T$ appearing in the equation (1) are constant irrespective of the position is used, the derived STM image will represent the unevenness of the surface of the sample.

However, in many samples among those to be actually measured, the tunnel barrier height $\phi$ and tunnel resistance $R_T$ of tend to locally vary. The STM image for such samples contains information representing the unevenness of the surface of the sample and information representing difference in the energy state of tunneling electrons in different positions.

As a method for separating these items of information of the STM image, there are provided a method (differential conductance method) for deriving the distribution of density of states of electrons and phonons based on the dependency of the tunnel current $I_T$ on the bias voltage $V_T$ such as $\partial I_T/\partial V_T$, $\partial I_T/\partial V T/I_T/V_T$ or $\partial^2 I_T/\partial V_T^2$ and a method (barrier height method) for microscope for effecting the above methods is generally called a scanning tunneling spectroscope (STS).

The reason why the density of states of electrons and the tunnel barrier height can be derived by means of the STS respectively based on $\partial I_T/\partial V_T$ and $\partial \ln I_T/\partial S$ as described above is as follows The equation (1) of the tunnel current $I_T$ used for explaining the principle of the above STM is derived on the assumption that the tunnel barrier height $\phi$ can be kept constant.

However, on the actual surface, the tunnel barrier height $\phi$ and the probability of existence of tunneling electrons are not uniform. When this is taken into consideration, the tunnel current $I_T$ can be derived by the following equation.

$$I_T \propto \int_0^{eV_T} \rho(E) \cdot T(E, eV_T) dE \quad (2)$$

[Rev.Sci. Instrum. 60(2), February 1989, p165]
where $\rho(E)$ indicates the local state density on the surface of the sample, $V_T$ indicates the bias voltage of the sample with respect to the probe, and $T(E, eV_T)$ indicates the tunneling probability of electrons with energy E and can be expressed as follows:

$$T(E, eV_T) = \exp\left\{-2S\left[\frac{2m}{h^2}\left(\phi - E + \frac{eV_T}{2}\right)\right]^{\frac{1}{2}}\right\} \quad (3)$$

It is understood from the above description that $\rho(E)$ can be derived by differentiating $I_T$ with respect to $V_T$ ($\partial I_T/\partial V T \propto \rho(E)$).

Further, $\phi$ can be derived by differentiating the logarithm of $I_T$ with respect to S according to the equation (1) or (2) ($\partial \ln I_T/\partial S \propto \frac{1}{2}$).

This invention relates to an STS. First, the differential conductance method which is effected in the prior art is explained and then the barrier height method is explained.

A conventional case (1): A tunnel differential conductance measuring method by lock-in detection (IBM, J. Res. Develop Vol 30 No. 4, July 1986, pp. 411 to 416).

In the device shown in FIG. 1, a servo operation is effected to keep constant a tunnel current flowing when a probe 2 is set near a sample 1 while a D.C. bias voltage $V_0$ from a D.C. bias voltage generator 6 is being applied between the sample 1 and the probe 2. At this time, in order to obtain local spectroscopic information on the surface at the tip end of the probe 2, the differential conductance of the tunnel current is measured For this purpose, an A.C. modulated ($\Delta V_T \cos\omega t$) signal which is minute in comparison with the bias voltage is supplied from a sine wave generator 7 and superposed on the bias voltage. The tunnel current $I_T$ obtained at this time can be expressed as follows with attention given to modulated signal components.

$$I_T(V_0 + \Delta V_T \cos\omega t) \approx I_T(V_0) + \Delta V_T \cos\omega t \times \left.\frac{\partial I_T}{\partial V_T}\right|_{V_T=V_0}$$

where $\Delta V_T$ is a known value, and a partial differential conductance, in the D.C. bias voltage Vo, that is, $(\partial I_T/\partial V_T)|V_T=V_o$ can be measured by detecting the amplitude of the $\omega$ component appearing in the tunnel current by use of a lock-in amplifier 8.

Further, in FIG. 1, a reference numeral 3 denotes a pre-amplifier for detecting the tunnel current, and a symbol 4 denotes an XY direction finely driving mechanism for controlling a distance between the probe 2 and the sample 1 and scanning the probe 2.

A conventional case (2): LTTM (Low Temperature Tunneling Microscopy) (Phys. Rev. Lett. Vol. 54 No. 22. June 3, 1985, pp. 2433 to 2436).

In the above conventional case, attention was paid to the fact that, in a case where an attempt is made to measure the distribution of superconductive state on the surface of a superconductive sample by use of an STS operated at low temperatures, the value of the differential conductance (dI/dV) in the tunnel junction portion in the bias voltage of 0 V becomes 0 when an SIN (superconductor/insulator/normal conductor) junction is used as shown in FIG. 2A and the value is set to a limited value when an NIN (normal conductor/insulator/normal conductor) junction is used as shown in FIG. 2B, and then an attempt was made to measure the distribution of superconductive state by deriving the differential conductance when the bias voltage is set at 0 V.

In a device shown in FIG. 3, a servo operation is effected in which the probe 2 is set near the sample 1 so as to cause a tunnel current to flow while a triangular wave voltage from a bias voltage generator 6 is being applied between the sample I and the probe 2, the amplitude of the tunnel current is detected by the lock-in amplifier 8 and the amplitude of the tunnel current is kept constant by a servo circuit 5. The differential conductance value is derived by differentiating the tunnel current with respect to time by a differentiating circuit 10 (since the bias voltage is a triangular wave, $|\partial V_T/\partial t|$ is constant. Therefore, the differential conductance $= |\partial I_T/\partial V_T| = |\partial I_T/\partial t| / |\partial V_T/\partial t| \propto |\partial I_T/\partial t|$). While the servo control operation is being effected, an image of unevenness is derived by scanning the probe in the XY directions At the same time, as shown in FIG. 4, the distribution image of the differential conductance for the bias voltage of 0 V is derived by detecting a differential conductance obtained when the bias voltage is set to 0 V by using a zero-cross detector 11 and a shot pulse generator 12 and sampling the same by using a sample-hold amplifier 13 in connection with the XY scanning operation.

A conventional case (3): CITS (Current Imaging Tunneling Spectroscopy) method (Phys. Rev. Lett. 56, 18, May 5, 1986, pp 1972 to 1975, J. Vac. Sci. Technol. A6(2), Mar/Apr. 1988, pp344 to 348).

This method is to measure the distribution of local state density of surface electrons based on the dependency of the tunnel current $I_T$ on the bias voltage $V_T$. This method is based on the fact that a differential conductance $\partial I_T/\partial V_T$ is proportional to the local state density if a tunnel gap S and a barrier height $\phi$ are constant irrespective of the position on the surface of the sample.

In the CITS method, the local current and voltage values are individually stored for each position while the probe is being scanned and then the differential conductance is derived by numerical calculations. The measurement of the current-voltage characteristic in the CITS method is effected using a construction shown in FIG. 5 at timings shown in FIGS. 6A to 6E.

When a bias voltage shown in FIG. 6D which is output from a D/A converter 20 is a D.C. voltage, a fixing signal is interrupted as shown in FIG. 6A so as to set an STM servo system 22 into a servo condition by means of an ON-OFF signal generator 21 of the STM servo system and a Z direction finely moving control is effected by means of the finely driving mechanism 4 to keep the tunnel current constant. The STM servo voltage is converted into a corresponding digital signal at timings shown in FIG. 6B by means of an A/D converter 23 and recorded on a recording device or display device (not shown). Next, as shown in FIG. 6A, the servo system 22 is interrupted and the probe-sample distance is kept unchanged. In this condition, a bias voltage output from a D/A converter 20 as shown in FIG. 6D is scanned, and an A/D converter 24 is operated at timings as shown in FIG. 6C to convert the tunnel current output varying as shown in FIG. 6E into a corresponding digital signal and record the same on a recording device or display device (not shown). After this, the bias voltage is set again to the initially set value to effect the Z axis control. A sequence of operations based on the time sequence of FIG. 6 are repeatedly effected at respective points of the XY scanning voltages to simultaneously record normal unevenness data and local current-voltage characteristic data.

A symbol 25 in FIG. 5 denotes a data processor for subjecting the current data to numerical calculation processes to construct the local state density.

A conventional case (4): Barrier Height Spectroscopy (IBM, J. RES. DEVELOP. Vol. 30, No. 4, July 1986, pp355 to 369, Phys. Rev. Lett. Vol. 60, No. 12, March 21, 1988 pp1166 to 1169).

In a device shown in FIG. 7, a bias voltage $V_T$ is applied between the probe 2 and the sample 1, a distance (tunnel gap S) between the tip end of the probe and the sample is set less than several nm, a current flowing at this time is detected by an I/V converter 3, and the distance S is servo-controlled by using a Z axis finely driving mechanism of the X, Y and Z finely driving mechanism 4 so as to permit the tunnel current to be kept constant by means of the servo circuit 5. When the probe is scanned in the XY directions by the X, Y and Z finely driving mechanism 4 while the servo operation is being effected, information representing the unevenness of the surface of the sample can be derived based on a servo output signal In a case where the servo operation cannot follow variation in the servo output signal of the STM (for example, at a speed of 1/5 of the time constant), a minute modulated signal ($\Delta S \cos\omega t$) having the known amplitude is added thereto and applied to the Z axis finely driving mechanism. An application of the modulated signal ($\Delta S \cos\omega t$) causes a modulated component of the same frequency to be introduced in a tunnel current flowing between the sample and the probe.

By deriving the logarithm of the tunnel current $I_T$ using the equation (1), the following equation can be obtained.

$$\ln I_T = -B\sqrt{\phi}\; \Delta S \cos\omega t + const \quad (4)$$

In this case, the term "const" component means that it takes substantially the same value in respective periods of time of the modulated component $\omega$. Therefore, the value of barrier height $\phi$ can be determined by deriving $\omega$ modulated amplitude ($B\phi^{\frac{1}{2}}\Delta S$) by a modulated component detector 30. That is, the barrier height $\phi$ can be derived at the same time as the unevenness information derived from the servo output signal is obtained. In the drawing, a symbol 31 denotes an applied signal oscillator and a symbol 32 denotes a logarithm amplifier.

The defect of the conventional case (1)

In the measurement by a method in which a minute A.C. modulated signal is superposed on the D.C. bias voltage, a differential conductance at a point at which the D.C. bias value Vo is set is derived It is necessary to stably effect the probe servo operation with the set bias voltage, however, a bias voltage with which the servo operation cannot be stably effected for some surface conditions of the sample or probe is present, making it impossible to continuously measure the dependency on the bias voltage. Further, the position at which the bias voltage can be measured at one time is limited to one point and therefore the dependency of the local spectroscopic data on the bias voltage cannot be measured on the real time basis.

Further, in the servo operation effected by a D.C. bias voltage, the height of the probe and the amount of associated tunnel current may vary according to a difference in the bias voltage setting value and tunnel current setting value, and even if the dependency of the differential conductance on the bias voltage is measured at the same point, the tunnel condition such as the sample-probe distance may be changed when the bias voltage setting value is changed, thus making it impossible to measure the dependency thereof on the bias voltage under the same condition.

The defect of the conventional case (2)

In the measurement of the distribution of the superconductive state, an attempt is made to measure the superconductive state with much stress put only on the value of the differential conductance obtained when the bias voltage is 0 V. In order to determine the superconductive state, it is necessary to obtain information of the differential conductance at points other than 0 V by, for example, measuring the differential conductance at a bias voltage corresponding to a superconductive gap voltage at which the differential conductance rapidly varies. Further, when a general material is used, it becomes necessary to set a characteristic bias voltage inherent to the material and derive the differential conductance at the thus set bias voltage. However, with this method, it is only possible to measure the differential conductance set when the bias voltage is at 0 V.

Further, in order to prevent the servo operation from being influenced by harmonic components included in the bias voltage and becoming unstable, it is necessary to add a sine wave to the bias voltage, or in order to measure the dependency thereof on the response speed, it is necessary to apply a sawtooth wave. In this way, it is required to freely set the bias voltage waveform according to the measurements. However, in this measuring method, the application waveform must be a triangular waveform to measure the differential conductance.

The defect of the conventional case (3)

Since time sharing operation is effected and the servo operation is repeatedly set ON and OFF for each measuring point to record values of the current and voltage at each measuring point, the probe control system will response in a stepwise manner when the servo operation is set ON or OFF, thereby causing resonance or instability in the system. Particularly, when the servo operation for a distance between the sample and the probe is unstable, it becomes impossible to effect the STM and STS measurements.

Further, since spectroscopic data is derived by effecting the numerical operation such as differentiation based on the stored current and voltage, the number of data necessary for deriving one item of information becomes large, thus making it necessary to store a larger number of current values at each image point. For example, in a typical CITS operation, STM data is recorded on 128×128 points and more than 16 current-voltage characteristic data are recorded on each point. In this case, an STM data file of 16K points and an STS file having data of 256K points are necessary and therefore the number of data is increased.

Further, since differential spectroscopic information must be subjected to a numerical operation process after it has been received, the differential spectroscopic information cannot be displayed during the measurement on the real time basis.

The defect of the conventional case (4)

Since a method of comparing the modulated amplitudes to derive a differential value, the differential value cannot be derived if the application amplitude is not minute. Therefore, the application amplitude is limited, thus restricting the measurement range in the Z direction.

Further, since the modulated amplitude is minute, the relation between the barrier height $\phi$ and tunnel gap S cannot be measured over a wide range, and particularly, when the relation between the $\ln I_T$ and S is nonlinear, the barrier height $\phi$ cannot be precisely derived.

SUMMARY OF THE INVENTION

An object of this invention is to provide a scanning tunneling spectroscope capable of continuously measuring the surface condition of a sample with a high precision even if the surface conditions of the sample and a probe are locally changed and a spectroscopic measuring method.

Now, the basic concept of this invention is explained for the differential conductance method and barrier height method.

(1) Differential Conductance Method

The construction necessary for solving the defect of the above conventional cases is shown in FIG. 8.

When a bias voltage is applied between a sample 41 and a probe 42 and they are set closer to each other at a distance of several nm, a tunnel current will flow, so that a tunnel current signal $I_T$ is delivered from a current-voltage converter 48. Here, the signal $I_T$ is a voltage signal representing a tunnel current at this time, if the probe is moved in the Z direction by a Z-direction driving mechanism (not shown) to be set close to the sample while a bias voltage $V_T$ (for example, a sine wave shown by (a) in FIG. 9) which varies with time in a constant period is being applied between the sample 41 and the probe 42 from a bias voltage generator 43, a tunnel current signal $I_T$ (shown by (b) in FIG. 9) oscillating at a fundamental frequency of the bias voltage is delivered from the converter 48. In this case, in order to keep the distance between the sample and the probe like the case wherein a normal STM is used, a servo operation for keeping the average of the absolute value of the tunnel current signal constant is effected. In order to prevent the distance between the sample and the probe from being influenced by the oscillation of the tunnel current, the time constant of a feedback system formed of an absolute detector or amplitude detector 44 for detecting the absolute value (shown by (c) in FIG. 9) or amplitude of the tunnel current and a servo circuit 45 is set to be sufficiently longer (more than five times longer) than the fundamental period of the bias voltage. The servo circuit 45 is a servo system which can control the sample-probe distance to vary as shown by a signal (d) in FIG. 9 by using a signal shown by (e) in FIG. 9 and whose servo time constant can be set to prevent the operation thereof from following variation in the bias voltage so as to set the average of the intensity of the tunnel current signal constant in a specified period of time. On the other hand, when the probe 41 is scanned, the scanning speed is so set as to attain an effective feedback operation and keep the sample-probe distance unchanged. In this condition, a servo signal obtained by scanning the probe 42 is used as information representing the unevenness of the surface.

When the servo time constant and fundamental period are determined in the manner as described above, a servo operation can be effected by using a desired bias voltage containing frequency components higher than the fundamental frequency.

Further, if a tunnel current signal and a bias voltage are input to an analog operation unit 46 to effect the calculation process (for example, $\partial I_T/\partial V_T$, $\partial^2 I_T/\partial V_T^2$) on the real time basis in order to obtain spectroscopic information on the real time basis, spectroscopic information (state density, phonon mode and the like) in the range of the bias voltage amplitude can be obtained on the real time basis. The response frequencies of the analog signal system are set higher than the fundamental frequency of the bias voltage. The analog operation unit 46 is constructed to effect differentiation, addition, subtraction, multiplication and division in combination in order to derive spectroscopic information.

Since the operation of deriving the spectroscopic information is effected on the real time basis, a post-processing such as numerical differentiation with respect to data is not necessary. The spectroscopic data obtained for one voltage level is in one-to-one correspondence with unevenness data and the memory capacity necessary is simply proportional to the number of necessary images.

With the above functions, a spatial distribution (STS image) of spectroscopic information and unevenness image can be detected on the real time basis.

(2) Barrier Height Method

The construction necessary for solving the defect of the above prior art is shown in FIG. 10.

This invention is to derive a barrier height $\phi$ by analog calculations using a differentiating circuit and the like instead of effecting the comparison detection of the amplitude of a modulated signal using a lock-in amplifier and the like.

That is, the barrier height $\phi$ is derived by holding an output of the bias voltage generator 43 at a D.C. voltage, inputting to an analog operation circuit 51 a Z axis modulation voltage $\Delta V_Z$ to be applied to the Z finely driving mechanism of the XYZ finely driving mechanism 47 by dividing an output of an oscillator 50, inputting the tunnel current signal $I_T$ to the analog operation circuit 51 and effecting the analog operation process of $\partial \ln I_T/\partial \Delta V_Z \propto \partial \ln I_T/\partial S$ by means of the circuit 51 based on the two input signals.

When x axis and y axis scanning signals (raster scan) are supplied to the X and Y finely driving mechanism of the XYZ finely driving mechanism 47, a $\phi$ image ($\phi$ distribution image) of the sample can be obtained.

BRIEF DESCRIPTION OF THE DRAWINGS

FIGS. 5 and 6A to 6E are a circuit diagram for illustrating a third conventional device and a timing chart of signals used therein;

FIG. 10 is a basic circuit diagram for a barrier height method, for illustrating the basic concept of this invention;

FIG. 11 is a diagram showing capacitive coupling signal eliminating circuit used in a first embodiment based on the circuit of FIG. 8;

FIGS. 12A to 12D are waveform diagrams for illustrating an operation of the capacitive coupling eliminating circuit;

FIG. 13 is a circuit diagram showing an analog operation unit used in the first embodiment based on the circuit of FIG. 8;

FIG. 15 is a diagram showing a phase compensation circuit used in the first embodiment;

FIGS. 16A and 16B are oscillographic waveform diagrams showing the relation between $\partial I_T/\partial V_T$ and $V_T$ in different points of a graphite sample used in the first embodiment;

DETAILED DESCRIPTION OF THE PREFERRED EMBODIMENTS

Figure 1:
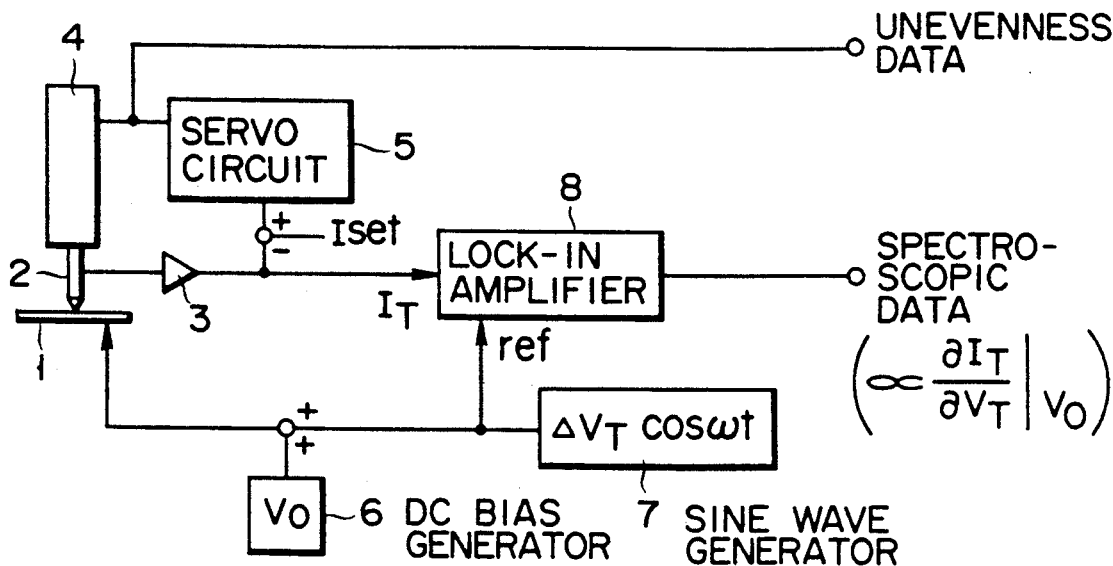
FIG. 1 is a circuit diagram for explaining a first conventional device.
Figure 2A:
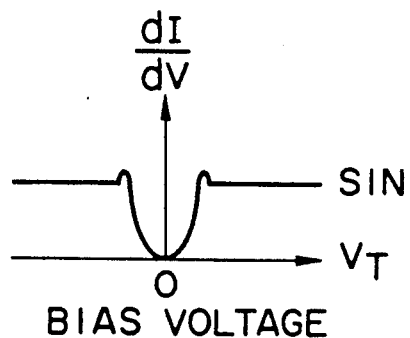
FIGS. 2A and 2B are diagrams illustrating a second conventional device and showing bias voltage-differential conductance characteristics in the SIN and NIN.
Figure 2B:
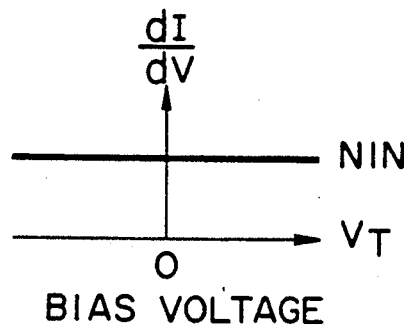
Figure 3:
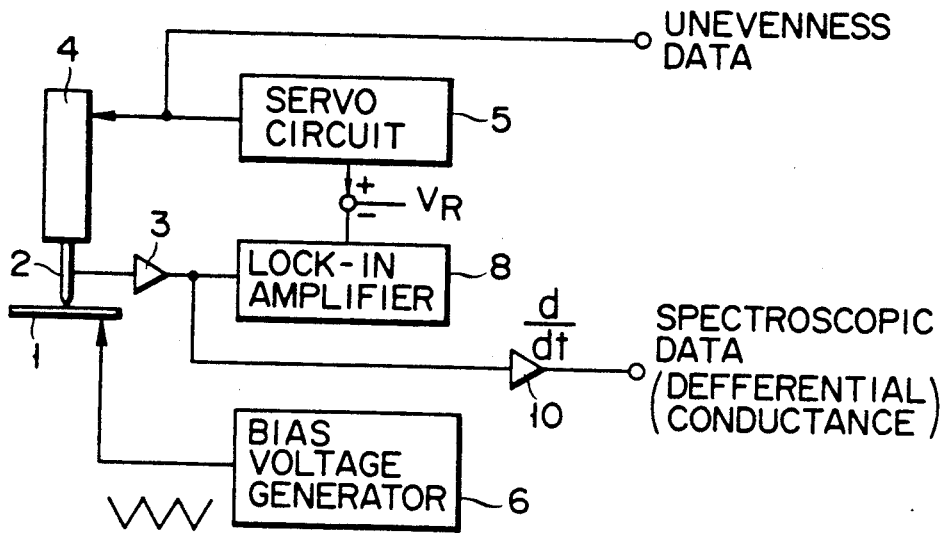
FIG. 3 is a circuit diagram showing a differential conductance detection system of the second conventional device.
Figure 4:
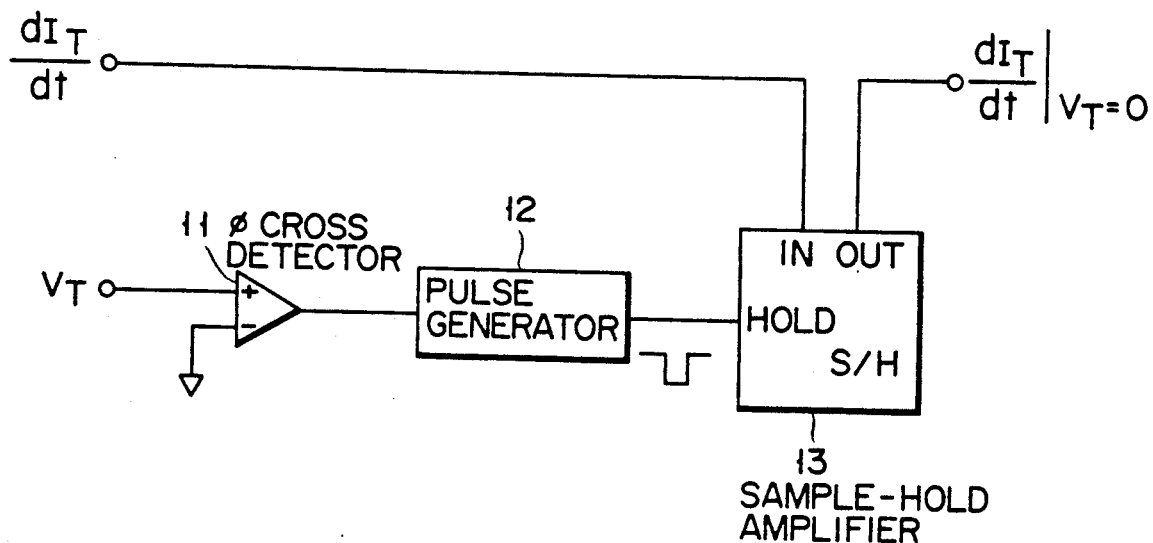
FIG. 4 is a circuit diagram of a spectroscopic sampling system for illustrating the second conventional device.
Figure 5:
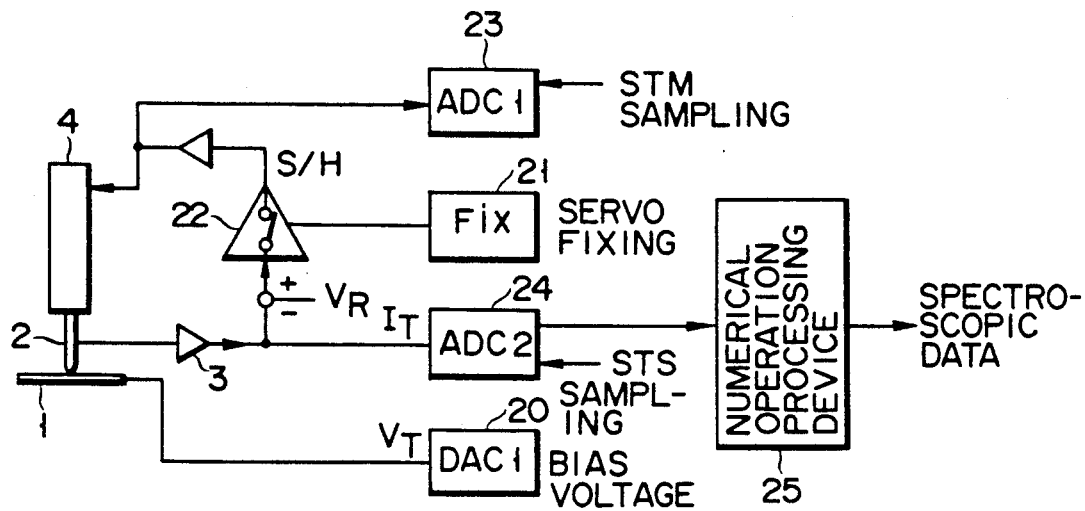
Figure 7:
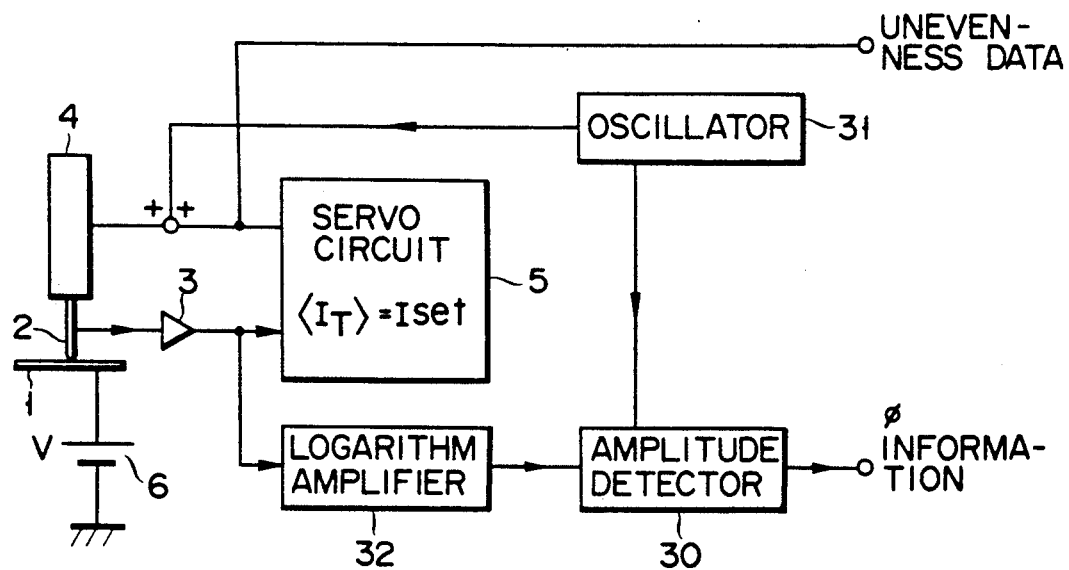
FIG. 7 is a circuit diagram illustrating a fourth conventional device.

There is now explained an embodiment of this invention with reference to the accompanying drawings. Constituting elements which are substantially the same as those in FIGS. 8 and 10 denoted by the same reference numerals and the explanation therefor is omitted.

Embodiment 1
Differential Conductance Spectroscopic Method

In this example, the real time measurement of the dependency of the local differential conductance on the bias voltage is first explained.

The measurement is effected with the construction explained with reference to FIG. 8 and an additional explanation for the concrete constituent elements in the differential conductance measurements made here.

A sample 41 is made of graphite and a probe 42 is a needle of PtIr formed by electrolytic polishing. A servo system 45 is a integration type servo circuit. A sine wave is generated from a bias voltage generator 43.

When a bias voltage varies with time in the form of waveform shown in FIG. 12A, a capacitive coupling signal which is phase-shifted with respect to the bias voltage by 90° as shown in FIG. 12B by the effect of capacitive coupling between the sample and a probe-supporting member of the actuator may be output from a current/voltage converter 48 connected to the probe which is kept close to the sample to the time immediately before a tunnel current starts to flow, and the capacitive coupling signal may give a bad influence on the measurement. In order to solve this problem, the following procedure may be taken. The capacitive coupling voltage signal is substantially the same immediately before and after the tunnel current has started to flow between the sample and the probe. With this fact taken into consideration, the capacitive coupling voltage signal is subtracted from the output of the current/voltage converter by using the circuit of FIG. 11. When the bias voltage has a sine wave set at 1 $V_{pp}$ and 2 KHz, as shown in FIG. 12A, and the probe has reached a position several $\mu$m before a position in which the tunnel current starts to flow, the $I_T$-$V_T$ converter 48 outputs a signal as shown in FIG. 12B. At this time, the phase of the bias voltage signal is shifted by 90° through a phase shifter 100 shown in FIG. 11 to synchronize with that of the capacitive coupling voltage signal, and the amplitude of former signal is set equal to that of the latter signal by using an amplifier 101. Thus, a dummy capacitive coupling voltage signal is obtained from the bias voltage. When the probe is set closer to the sample to such a distance as to permit the tunnel current to flow between the probe and sample, the converter 48 outputs a signal as shown in FIG. 12C, in which the tunnel current signal is superposed with the capacitive coupling voltage signal. A tunnel current signal as shown in FIG. 12D is obtained by subtracting the dummy tunnel current signal from the output signal by means of a subtractor 102. The STM and STS operations are effected using the thus obtained tunnel current signal in which the capacitive coupling voltage signal is removed. If an $I_T$-$V_T$ converter of a high impedance is used, a phase delay may sometimes occur in the current detecting signal due to a floating capacity, induction, etc. in the circuit. To compensate this phase delay, the phase shifter is set to match the phases except for 90°.

Figure 14A:
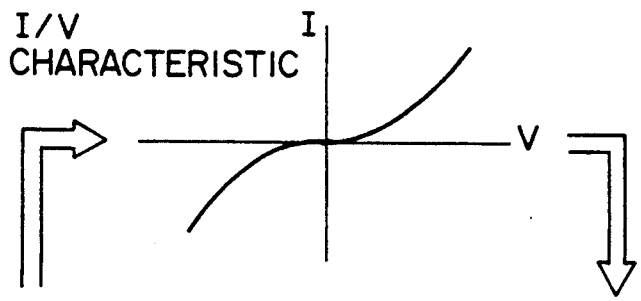
FIGS. 14A to 14G are waveform diagrams showing signals in respective elements in the first embodiment.
Figure 14B:
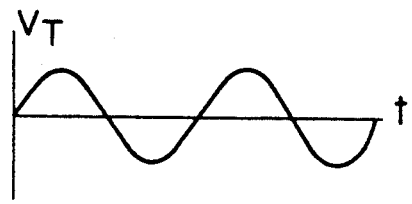
Figure 14C:
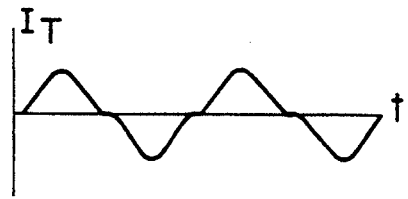
Figure 14D:
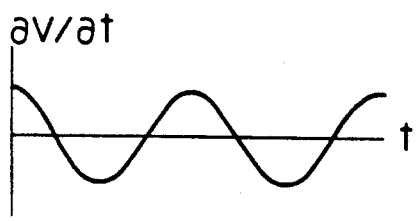
Figure 14E:
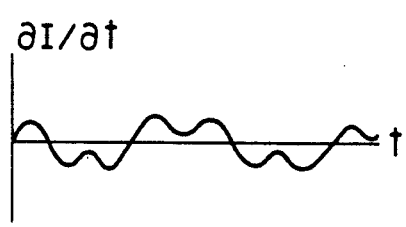
Figure 14F:
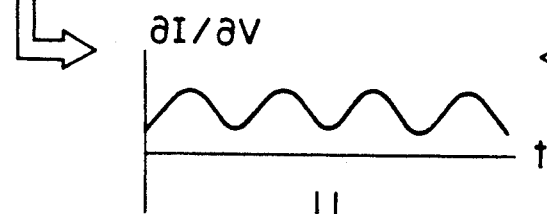

The analog operation unit 46 for deriving the differential conductance is constructed as shown in FIG. 13 and the model of the operation principle is shown in FIGS. 14A to 14G. The local current-voltage characteristic between the sample and the probe takes an inherent form as shown in FIG. 14A according to the position of atoms. When a sine wave bias voltage $V_T$ as shown in FIG. 14B is applied, a tunnel current signal will reflect the local $I_T$-$V_T$ characteristic of FIG. 14A, as shown in FIG. 14C. The tunnel current signal of FIG. 14C and the biased voltage of FIG. 14B are differentiated with respect to time by the two differentiating circuits 500 and 510 shown in FIG. 13 to derive a $\partial V_T/\partial t$ signal shown in FIG. 14D and a $\partial I_T/\partial t$ signal shown in FIG. 14E. The two signals are input to a division circuit 52 to derive a differential conductance $\partial I_T/\partial V_T$ shown in FIG. 14F.

At this time, the phases of the tunnel current signal and the bias voltage may be shifted from each other according to the time constant of the preamplifier. When the analog operation is effected in such a condition, the zero point of the tunnel current signal and the zero point of the bias voltage are used as references for synchronizing the timings and the phase of the bias voltage is shifted by use of a phase compensation circuit 60 shown in FIG. 15. Further, in order to prevent high-frequency noise caused by the differentiation with respect to time, the tunnel current signal and bias voltage are passed through low-pass filters 61 and 62 having the same time constant. In this way, the timings of the tunnel current signal and bias voltage used for the analog operation are prevented from being shifted.

Figure 14G:
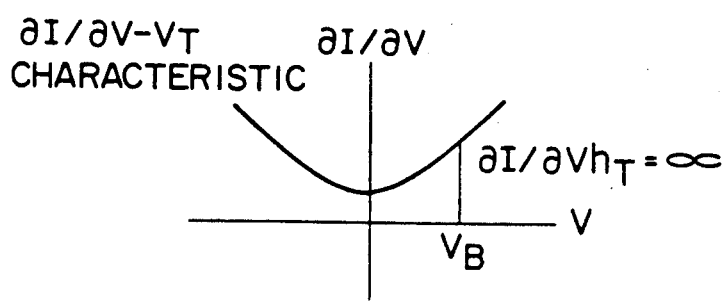

The bias voltage-differential conductance display as shown in FIG. 14G is effected by using a memory scope and inputting a differential conductance signal to a Y axis and a bias voltage to an X axis. FIGS. 16A and 16B show the relation between $\partial I_T/\partial V_T$ and $V_T$ at different points on the graphite sample thus displayed. The form of the graph may vary according to the movement of the probe, however, the reproducibility thereof at each point is confirmed. Further, in a case wherein the tunnel probability is largely dependent on $\phi$ and S, a data processing of $\partial I_T/\partial V_T/I/V$ becomes necessary.

Figure 8:
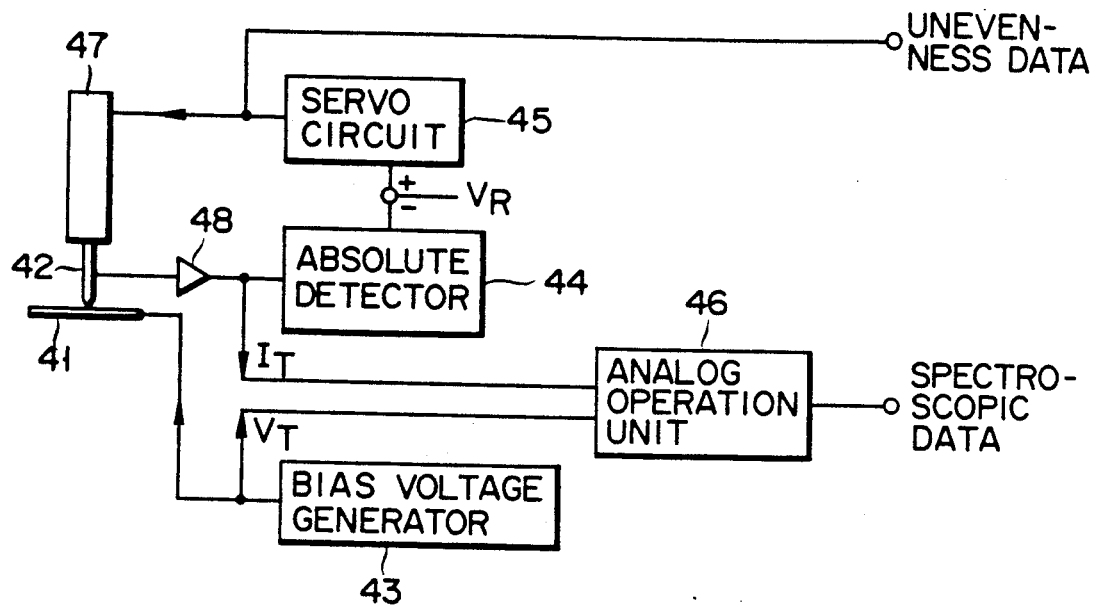
FIG. 8 is a basic circuit diagram for a differential conductance method, for illustrating the basic concept of this invention.
Figure 9:
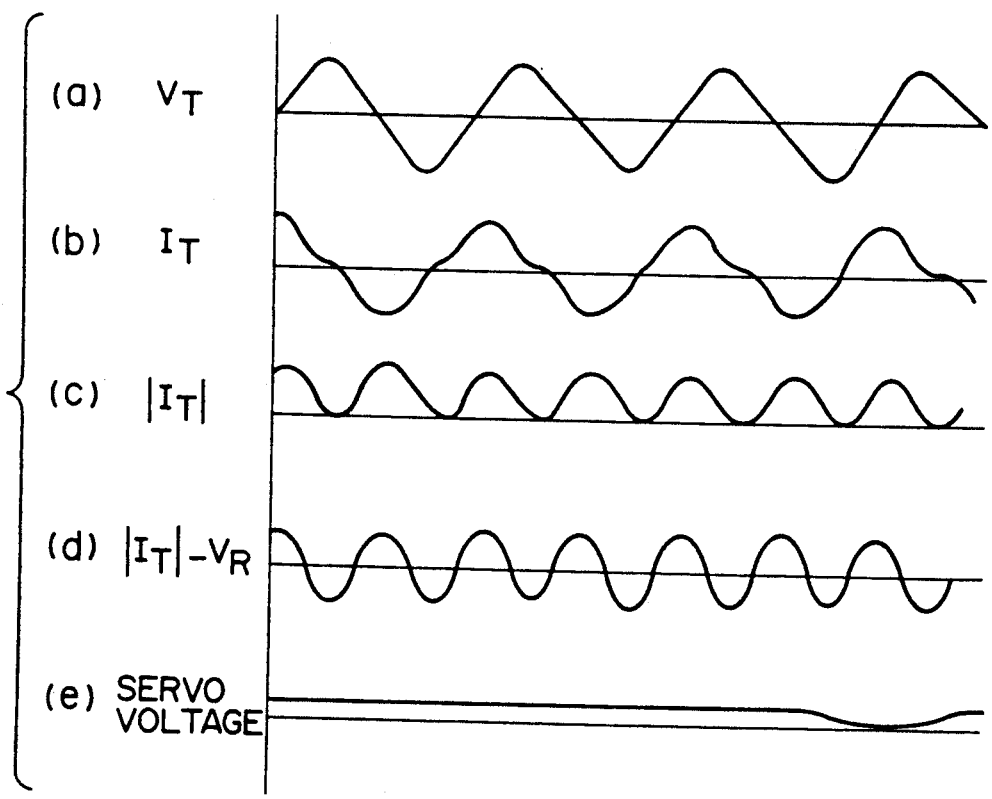
FIG. 9 is a diagram showing the relation between a servo voltage and a tunnel current signal used in the circuit of FIG. 8.
Figure 17:
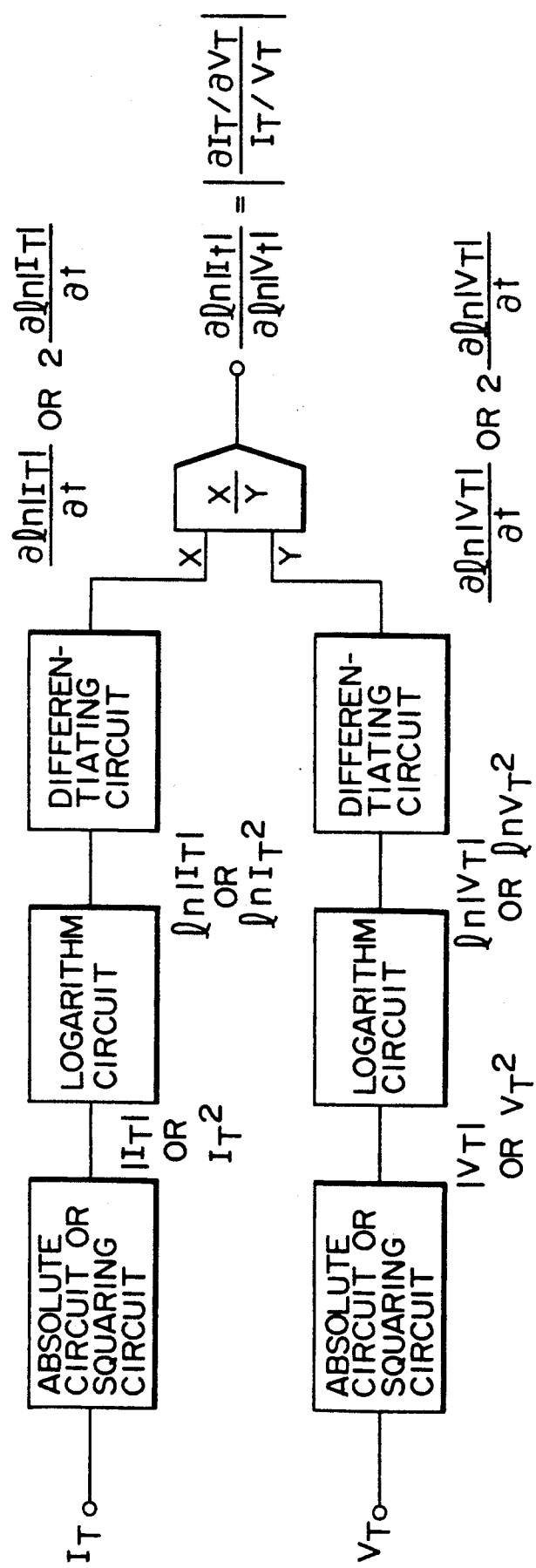
FIG. 17 is a detail circuit diagram of the analog operation unit shown in FIG. 8.

In order to effect the above data processing, the analog operation unit 46 shown in FIG. 8 may be modified into an analog circuit shown in FIG. 17.

Embodiment 2

Next, the real time measurement of differential conductance values at a specified bias voltage and the distribution image measurement are explained.

Figure 18:
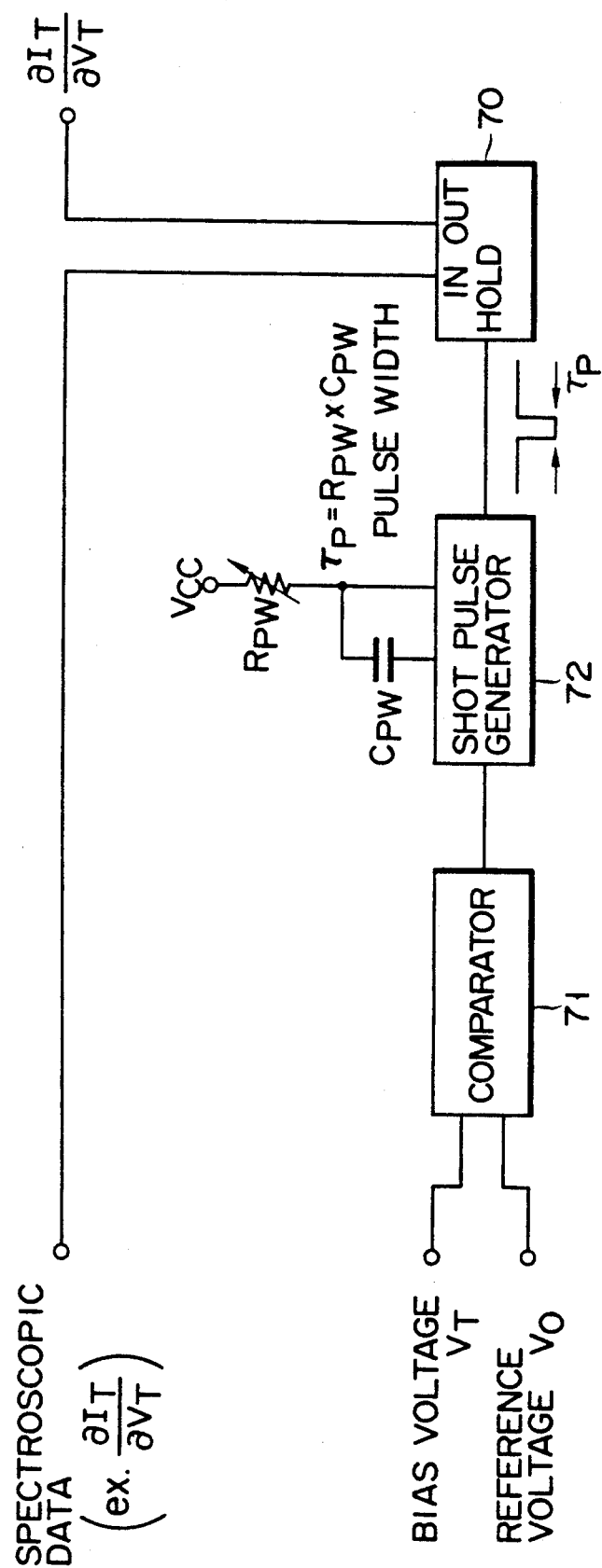
FIG. 18 is a diagram showing a sampling circuit according to a second embodiment.

A circuit of FIG. 18 is a sampling circuit used for always outputting the differential conductance value at the specified voltage. A differential conductance value ($\partial I_T/\partial V_T$) output from a differential conductance operation circuit shown in FIG. 13 is input to a sample-hold amplifier 70. A bias voltage $V_T$ and a reference voltage Vo are input to a comparator 71 which in turn outputs a corresponding binary signal, and a shot pulse generator 72 for generating a pulse whose pulse width $\tau_P$ generates a pulse which is sampled by the sample-hold amplifier 70 at a timing of $V_T=V_o$. Thus, the differential conductance value $[(\partial I_T/\partial V_T)|V_T=V_o]$ set when $V_T=V_o$ can be always output.

If the scanning speed of the probe is set such that the servo operation can follow the surface irregularity, a sample-probe distance is kept constant and the surface irregularity information and the differential conductance value at the bias voltage Vo are displayed in correspondence with the XY scanning signals, then the spatial relation between the unevenness image and differential conductance image can be displayed and compared on the real time basis.

Since the differential conductance can be independently sampled at a large number of reference voltages if sampling circuits are connected in parallel, values of the local differential conductance at a plurality of bias voltage levels can be simultaneously held. That is, a large number of images can be displayed at the same time.

Figure 19A:
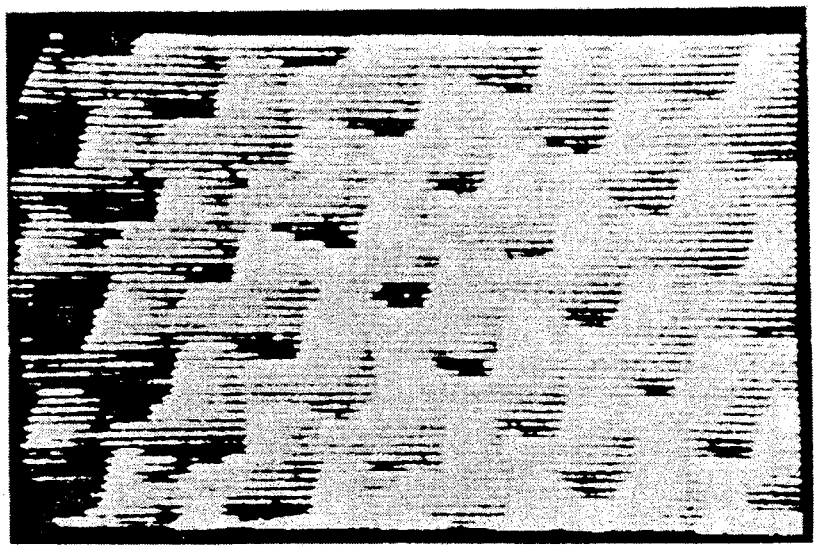
FIGS. 19A and 19B are oscillographic waveform diagrams showing the graphite surface in the second embodiment.
Figure 19B:
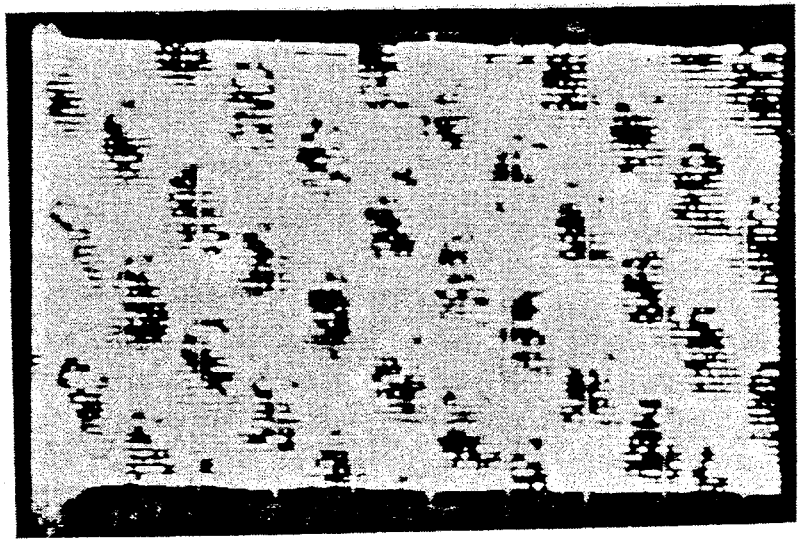

FIGS. 19A and 19B show an example of the measurement of the surface of the graphite in air FIG. 19A shows an unevenness image in which the servo voltage is related to the scanning voltage and high and low portions thereof are respectively displayed brightly and darkly with variable density. FIG. 19B shows a differential conductance image with variable density in which portions in which the value of the local differential conductance is large or current easily flows are displayed brightly and portions in which the value of the local differential conductance is small are displayed darkly In the unevenness image, an atomic-size unevenness can be observed on the right-side portion which is displayed darkly, but in the differential conductance image, the inclination of the sample does not appear and the distribution of differential conductance at 0.2 V can be observed on the entire surface with an atomic-level resolution. It is considered that, in those portions in which the differential conductance is large, the state density of electrons of a corresponding energy is high.

Embodiment 3

Figure 20:
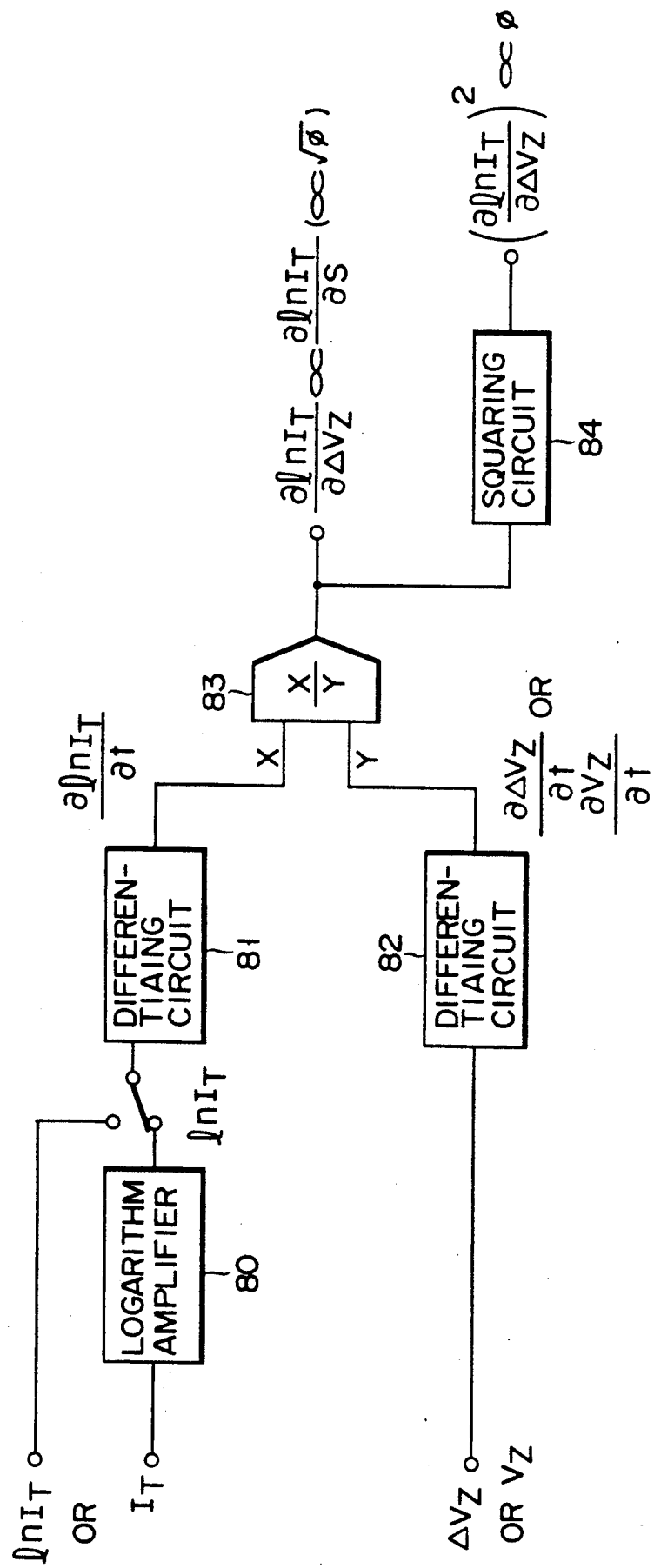
FIG. 20 is a diagram showing an analog spectroscopic circuit according to a third embodiment.

FIG. 20 shows an example of an actual analog spectroscopic circuit used for barrier height spectroscopy shown in FIG. 10.

A tunnel current $I_T$ is supplied to a first differentiating circuit 81 via a logarithm amplifier 80 and here differentiated with respect to time ($\partial \ln I_T/\partial t$) and a Z axis modulated voltage $\Delta V_Z$ is differentiated with respect to time by a second differentiating circuit 82 ($\partial \Delta V_Z/\partial t$).

Next, the differentiated values are subjected to division by a dividing circuit 83 to derive $\partial \ln I_T/\partial t/\partial \Delta V_Z/\partial t = \partial \ln I_T/\partial \Delta V_Z \propto \partial \ln I_T/\partial S$ and thus barrier height $\sqrt{\phi}$ can be obtained from equation (1).

In a case where the barrier height $\phi$ is necessary, it can be obtained by using a squaring circuit 84.

Embodiment 4

Figure 21:
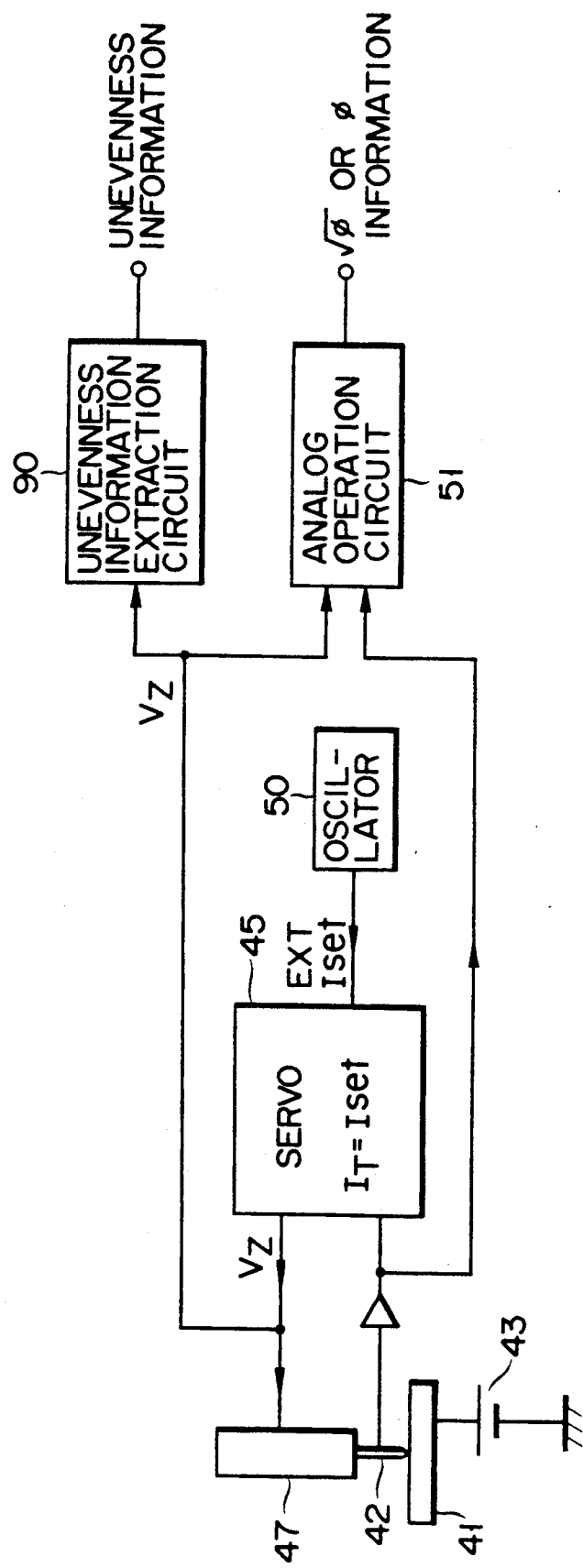
FIG. 21 is a circuit diagram for illustrating a fourth embodiment.

FIG. 21 shows another embodiment of the barrier height spectroscopy. In this embodiment, the set current value of a servo circuit 45 can be set by means of an external oscillator 50. In this case, the bias voltage is a D.C. voltage and the servo time constant is set such that the operation of the probe control circuit can follow variation in the set current. The modulation frequency of the set current cannot be set higher than the resonant frequency of the device system. An unevenness information extraction circuit 90 is used to compensate for oscillation of the probe caused by a difference in the set current and appearing on the unevenness image, and a smoothing circuit or the like is used for the extraction circuit.

If a display method for permitting only specified set current values to be sampled is used, it becomes unnecessary to use the unevenness information extraction circuit 90.

The same analog operation circuit as shown in FIG. 11 can be used as an analog operation circuit 51.

The output waveform of the oscillator in the embodiments 3 and 4 can be freely determined and since the logarithm of the tunnel current is always differentiated with respect to the tunnel gap, the modulation is not necessarily minute and the value of $\phi$ ($\sqrt{\phi}$) and the dependency of $\phi$ ($\sqrt{\phi}$) on S can be more precisely measured in comparison with the prior art case.

According to this invention, a differential conductance measuring device is provided which can selectively set the servo time constant to an adequate value when the bias voltage of the STS is changed with time in a constant period, effect the servo operation so as to keep the sample-probe distance constant during one or more periods of the bias voltage waveform, record the servo voltage and unevenness data, and measure the bias voltage dependency of the spectroscopic data derived from an analog operation unit which can derive local spectroscopic data based on the tunnel current and bias voltage on the real time basis with the sample-probe distance kept constant.

In this invention, if the bias voltage at which the spectroscopic data is sampled is within the range of the voltage amplitude thereof, a desired number of sampling points at desired voltages can be set. Therefore, the differential conductance at a voltage which cannot be measured in the D.C. bias operation and variation in the differential conductance at a superconductive gap voltage can be measured.

Further, since a plurality of measurement points can be set at the same time, spectroscopic data at each measurement point can be measured as the bias voltage dependency data at a required number of measurement points together with the unevenness of the surface of the sample.

In this invention, since the servo operation is not interrupted when the bias voltage is changed, the servo operation effected according to the scanning operation will not exhibit a stepwise response.

Further, since the spectroscopic data is output from the analog operation unit on the real time basis, a post-processing for the spectroscopic data by a CPU or the like is not necessary. Also, since numerical differentiation or the like for the measurement data is not necessary, it becomes unnecessary to store a large amount of data.

In addition, if a Z axis modulation voltage $\Delta V_Z$ is used instead of the bias voltage $V_T$ in the analog operation circuit used in the differentiation conductance method, the barrier height $\phi$ ($\sqrt{\phi}$) can be obtained, and the value of $\phi$ ($\sqrt{\phi}$) and the dependency of $\phi$) ($\sqrt{\phi}$) on S can be more precisely measured in comparison with the prior art case.

What is claimed is:

1. A scanning tunnel spectroscope comprising
a probe settable close to a sample;
means for applying a bias voltage ($V_T$) of a preset waveform varying with time in a constant period between said sample and probe;
means for current-voltage converting a tunnel current flowing when said probe is set close to said sample, to a tunnel current signal ($I_T$);
means for detecting the absolute value of the tunnel current signal ($I_T$);
means for servo-controlling a distance between said sample and probe using the absolute value with the servo time constant set larger than five times the period of the bias voltage;

means for obtaining information concerning the unevenness of said sample based on an output of said servo control means; and means for effecting the analog operation to derive a differential conductance based on the tunnel current on the real time basis and measuring the unevenness data and differential conductance data on the real time basis with the distance between said sample and probe kept constant.

2. A scanning tunnel spectroscope according to claim 1, wherein said detecting means includes means for detecting the fundamental frequency component of the bias voltage in the tunnel current signal and said servo control means controls the distance between said sample and probe using the fundamental frequency component.

3. A scanning tunnel spectroscope according to claim 1, wherein said bias voltage application means includes a sine wave voltage generator.

4. A scanning tunnel spectroscope according to claim 1, wherein said real-time measuring means includes a differentiating circuit for differentiating the tunnel current signal ($I_T$) and bias voltage ($V_T$) with respect to time and a division circuit for deriving a differential conductance ($\partial I_T/\partial V_T$) based on the time-differentiated values on the real time basis.

5. A scanning tunnel spectroscope according to claim 1, wherein said real-time measuring means includes a logarithm amplifier means for deriving the logarithms of the tunnel current signal ($I_T$) and the bias voltage ($V_T$), and means for differentiating the logarithms with respect to time and subjecting the differentiated values to to a dividing operation to derive the differential conductance ($\partial I_T/\partial V_T/I/V$) on the real time basis.

6. A scanning tunnel spectroscope according to claim 1, further comprising means for holding only differential conductance data which is included in local differential conductance data output on the real time basis from said real-time measuring means at a desired voltage within the range of the bias voltage amplitude and which corresponds to a specified bias voltage based on the output voltage and the direction of variation in the output voltage from said bias voltage application means.

7. A scanning tunnel spectroscope according to claim 1, further comprising means for sampling and holding local differential conductance data output on the real time basis from said real-time measuring means at at least one desired voltage within the range of the bias voltage amplitude at a desired timing in a constant period of an output voltage from said bias voltage application means.

8. A scanning tunnel spectroscope according to claim 1, further comprising a phase compensation circuit for setting the tunnel current signal ($I_T$) and bias voltage ($V_T$) supplied to said real-time measuring means in-phase with each other.

9. A scanning tunnel spectroscope according to claim 1, further comprising means for removing a signal having a phase different from that of the bias voltage appearing in the tunnel current voltage from the current-voltage converting means due to a conductivity coupling between means for supporting the probe and the sample.

10. A scanning tunnel spectroscope comprising:
means for applying a bias voltage ($V_T$) of a preset waveform varying with time in a constant period between a sample and probe;

means for adding a D.C. offset voltage to said bias voltage to make the bias voltage positive or negative;

means for current-voltage converting a tunnel current flowing when the probe is set close to the sample, to a tunnel current signal ($I_T$);

means for servo-controlling a distance between said sample and probe using the tunnel current signal ($I_T$) with the servo time constant set larger than five times the period of the bias voltage;

means for obtaining information concerning the unevenness of said sample based on an output of said servo control means; and means for effecting the analog operation to derive a differential conductance based on the tunnel current on the real time basis and measuring the unevenness data and differential conductance data on the real time basis with the distance between said sample and probe kept constant.

11. A scanning tunnel spectroscope in which a bias voltage ($V_T$) is applied between a sample and a probe, and a tunnel current ($I_T$) signal corresponding to a tunnel current flowing between the sample and the probe is detected to servo-operate the probe by means of an X, Y and Z finely driving mechanism, comprising:

means for applying a Z axis variation voltage ($\Delta V_Z$) having a period less than 1/5 of a servo time constant to said finely driving mechanism to finely move said probe in a Z direction; and analog operation means for receiving the Z axis variation voltage ($\Delta V_Z$) and the tunnel current signal ($I_T$) to derive a barrier height ($\phi$ or $\sqrt{\phi}$);

wherein an unevenness image is derived from the servo output and a barrier height image is derived from an output of said analog operation means.

12. A scanning tunnel spectroscopic information detecting method comprising the steps of:

applying a bias voltage ($V_T$) of a preset waveform varying with time in a constant period between a sample and a probe and detecting the absolute value of a tunnel current voltage signal ($I_T$) corresponding to a tunnel current flowing when said sample and probe are set close to each other;

servo-controlling a distance between said sample and probe using said absolute value while the time constant of a servo circuit is set to prevent the distance between said sample and probe from being influenced by oscillation of the bias voltage;

deriving information concerning the unevenness of said sample from an output of said servo control circuit; and effecting the analog operation to derive a differential conductance based on the tunnel current on the real time basis and measuring the unevenness data and differential conductance data on the real time basis with the distance between said sample and probe kept constant.

13. A scanning tunnel spectroscopic information detecting method according to claim 12, wherein said servo-controlling step includes a step of effecting the servo-control for a distance between said sample and probe using the fundamental frequency component of the bias voltage at a tunnel current signal ($I_T$).

14. A scanning tunnel spectroscopic information detecting method according to claim 12, wherein said bias voltage is a sine wave voltage.

15. A scanning tunnel spectroscopic information detecting method according to claim 12, wherein said step of real-time measuring the differential conductance data includes a step of deriving differential conductance data at at least one specified bias voltage signal from the local differential conductance data at a desired voltage within the range of the bias voltage amplitude.

16. A scanning tunnel spectroscopic information detecting method according to claim 12, further comprising a step of setting the tunnel current signal and the bias voltage signal in-phase with each other before said step of real-time measuring the differential conductance data.

17. A scanning tunnel spectroscopic information detecting method according to claim 12, further comprising a step for removing a capacitive component of a current generated between means for supporting the probe and the sample, from the tunnel current signal ($I_T$).

18. A scanning tunnel spectroscopic information detecting method comprising the steps of:

adding an offset voltage to a bias voltage ($V_T$) of a preset waveform varying with time in a constant period to make the sign of the bias voltage positive or negative, applying the added voltage between a sample and a probe and detecting a tunnel current flowing when said sample and probe are set close to each other;

servo-controlling a distance between said sample and probe using the tunnel current while the time constant of a servo circuit is set to prevent the distance between said sample and probe from being influenced by oscillation of the bias voltage;

deriving information concerning the unevenness of said sample from an output of said servo control circuit; and effecting the analog operation to derive a differential conductance based on the tunnel current on the real time basis and measuring the unevenness data and differential conductance data on the real time basis with the distance between said sample and probe kept constant.

19. In a current-voltage converting circuit which on a base of a modified alternating current signal applied on a load having a variable resistance, current-voltage converts a detected current flowing the resistance component of the load, the improvement in which the detected current is treated by a phase-shifter and an amplifier and compared with the modified alternating current signal so that a current component flowing a capacitive component generated by the load is removed from the detected current.

20. A circuit according to claim 19, wherein said load is a load between an STM probe and a sample, and said detected current is a tunnel current.

* * * * *

UNITED STATES PATENT AND TRADEMARK OFFICE
CERTIFICATE OF CORRECTION

PATENT NO. : 5,025,153
DATED : June 18, 1991
INVENTOR(S) : OKADA et al

It is certified that error appears in the above-identified patent and that said Letters Patent is hereby corrected as shown below:

Title page, Section [56] References Cited, insert after "U.S. PATENT DOCUMENTS", (left column), the following:

OTHER DOCUMENTS -

IBM J. RES. DEVELOP., VOL. 30, NO.4, JULY 1986
    PHYSICAL REVIEW LETTERS, VOL. 54, NO.22, 3 JUNE 1985
    REV. SCI. INSTRUM. 60(2), FEBRUARY 1989
    PHYSICAL REVIEW LETTERS, VOL.56, NO.18, 5 MAY 1986
    J. VAC. SCI. TECHNOL. A6(2), MAR/APR 1988
    IBM J. RES. DEVELOP., VOL. 30, NO. 4, JULY 1986

Signed and Sealed this

Eighteenth Day of May, 1993

Attest:

MICHAEL K. KIRK

Attesting Officer     Acting Commissioner of Patents and Trademarks